United States Patent [19]

Oki et al.

[11] Patent Number: 5,222,654
[45] Date of Patent: Jun. 29, 1993

[54] HOT PRESSURE WELDING OF HOT STEEL STOCK

[75] Inventors: Masami Oki; Hitoshi Teshigawara, both of Ibaraki; Takao Taka, Ikoma; Yasuto Fukada, Nishinomiya; Yutaka Suzuki, Sakura; Seiji Okada, Amagasaki, all of Japan

[73] Assignee: Sumitomo Metal Industries, Ltd., Osaka, Japan

[21] Appl. No.: 770,488

[22] Filed: Oct. 3, 1991

[30] Foreign Application Priority Data

Oct. 5, 1990 [JP] Japan .................. 2-268748
Jul. 10, 1991 [JP] Japan .................. 3-195767
Sep. 3, 1991 [JP] Japan .................. 3-222553

[51] Int. Cl.$^5$ .............................................. B23K 35/38
[52] U.S. Cl. ................................ 228/220; 228/902; 228/205
[58] Field of Search ............ 228/220, 218, 265, 205, 228/902, 176; 164/415; 72/38, 39

[56] References Cited

U.S. PATENT DOCUMENTS

| 2,735,170 | 2/1956 | Moffatt | 228/220 |
|---|---|---|---|
| 3,386,161 | 6/1968 | Ruf | 228/205 |
| 3,822,632 | 7/1974 | Chigiotti | 409/80 |
| 4,099,399 | 7/1978 | Berry et al. | 72/38 |
| 4,132,342 | 1/1979 | Nitto et al. | 228/136 |
| 4,377,732 | 3/1983 | Preller | 219/10.43 |
| 4,566,625 | 1/1986 | Moe | 228/220 |
| 4,798,932 | 1/1989 | Dion et al. | 228/197 |

FOREIGN PATENT DOCUMENTS

| 0296839 | 12/1988 | European Pat. Off. . | |
|---|---|---|---|
| 54-72743 | 6/1979 | Japan | 228/220 |
| 59-11392 | 3/1984 | Japan | 228/902 |
| 60-250811 | 12/1985 | Japan | 228/5.7 |
| 61-1489 | 1/1986 | Japan . | |
| 61-137691 | 6/1986 | Japan . | |
| 1-511035 | 9/1989 | U.S.S.R. | 228/205 |

OTHER PUBLICATIONS

Metals Handbook, 9th ed. vol. 6. 1983, pp. 672-691, 583-594, Glossary 14.

Primary Examiner—Mark Rosenbaum
Assistant Examiner—Jeanne M. Elpel
Attorney, Agent, or Firm—Burns, Doane, Swecker & Mathis

[57] ABSTRACT

A method of carrying out hot pressure welding of hot steel stock is disclosed, which is effective for achieving a continuous hot rolling line. The hot steel stock to be joined is subjected to butt joining or lap joining in a reducing atmosphere under pressure while under hot conditions.

23 Claims, 7 Drawing Sheets

HOT PRESSURE WELDING OF HOT STEEL STOCK

The present invention relates to hot pressure welding of steel stock, and more particularly to a method of efficiently joining steel stock under hot conditions, e.g., steel stock during hot rolling (hereunder called "hot steel stock") without cooling the stock to ambient temperature, resulting in a joint of high quality.

Many attempts have been made so as to achieve a continuous production line including various stages of steel making, not only for the purpose of increasing yield and production efficiency but also for the purpose of saving energy. Of these attempts, the most significant is an attempt to make a hot rolling line continuous by joining steel stock one by one and continuously supplying them to a hot rolling mill at a temperature of 500°–1000° C., for example.

It is well known that before going into a pickling line or a cold rolling tandem mill, the rear end of a preceding steel plate and the front end of the succeeding plate are joined so as to achieve a continuous supply of steel stock to the mill. Welding methods employed for this purpose include flash welding, laser welding, mesh seam welding, arc welding, and the like. However, the steel stock to be welded is once cooled to room temperature. Only limited areas are heated for carrying out welding.

It is quite difficult to apply the above-mentioned welding methods to steel plates which are heated and kept hot while running on a hot rolling line.

In flash welding, for example, since the whole plate to be welded is hot, the welding electrodes are damaged. Due to the presence of scale on the surface of steel plate, it is difficult to constantly supply a given density of current. Furthermore, formation of flashes causes damage to the maintenance of electrodes and the other apparatuses.

In the case of laser welding, it is impossible to weld steel plates thicker than 30 millimeters even by way of the most modern welding techniques. Plates of this thickness, are commonly subjected to hot rolling, so laser welding is impractical. When thin plates are joined using laser welding, it is impossible to obtain a butt joint with high precision. Thermal damage to lenses, mirrors, and other elements of the welder is also inevitable.

There are still problems with arc welding. Namely, a wire supply cannot be carried out smoothly under hot conditions, and sometimes melt-down of the opposing ends of the plates to be joined takes place, resulting in irregularity of penetration beads and a decrease in welding efficiency.

Japanese Patent Application Laid-Open Specification No. 137691/1986 proposed a mechanical joining method in which connecting plates are used. However, the joining strength is not sufficient for carrying out hot rolling so that if breakout of bonding happens during hot rolling, it would cause serious troubles such as damage to the production line, and failure of rolls.

Japan Patent Application Laid-Open Specification No. 1489/1986 proposed a method of lap welding in which descaling under wet conditions or mechanical descaling with a grinder is carried out. However, since the plates to be joined are hot, re-oxidation easily occurs before the plates are joined, resulting in insufficient joining strength.

SUMMARY OF THE INVENTION

A primary object of the present invention is to provide a joining method for hot steel stock in a continuous rolling line, especially a continuous hot rolling line.

A secondary object of the present invention is to provide a method of joining hot steel stock which can be easily and efficiently carried out under practical conditions in a production line, resulting in a sufficient level of joining strength for continuing the succeeding rolling.

It is common knowledge to the artisan that, as disclosed in Japan Patent Application Laid-Open Specification No. 1489/1986, oxide scale on the surfaces to be joined would be removed so as to make them as highly active as possible prior to carrying out joining, specifically pressure joining of steel stock. In contrast, the inventors of the present invention have found that it is possible to successfully carry out joining of hot steel stock even though the surfaces to be joined are partly covered with oxide scale if the joining is carried out in a suitable reducing atmosphere.

Steel stock, which has been produced by the preparation of a molten steel, casting, and rolling, has a complex oxide scale comprising ferrous oxide and oxides of Si, Mn, and other metals contained in the steel. When the joining is carried out under usual atmospheric conditions, it is necessary to clean the surfaces to be joined by means of a separate descaling step prior to effecting joining, because the presence of such a complex oxide scale adversely affects joining, resulting in a decrease in joining strength.

The inventors of the present invention discovered that a separate step of descaling prior to carrying out joining of hot steel stock is not necessary if the joining is carried out in a reducing atmosphere.

Accordingly, the present invention resides in a method of carrying out hot pressure welding of hot steel stock, characterized in that hot steel stock to be joined is subjected to butt joining or lap joining in a reducing atmosphere under pressure while the stock is still hot.

According to a preferred embodiment of the present invention, the stock is maintained hot using a reducing flame which is obtained by combusting fuel and combustion air under conditions defined by the following formulas:

$$P \geq 214\, m - 75 \quad (1)$$

$$P \geq -150\, m + 90 \quad (2)$$

wherein,
P is an oxygen enrichment ratio, i.e., the oxygen content in combustion air (% by volume), and
m is an oxygen ratio, i.e., the ratio of the amount of oxygen actually combusted to the amount required to achieve complete combustion of the fuel.

According to another preferred embodiment of the present invention, the joining of hot steel stock may be carried out, after hot scarfing, in a reducing atmosphere which is established by a preheating reducing flame.

In still another preferred embodiment the joining may be carried out after heating by means of induction heating or direct electric resistance heating in a reducing atmosphere.

The steel stock referred to in this specification includes steel plate, steel wire, steel bar, steel shapes, and the like. Hot welding refers to welding in which the above-mentioned steel stock is joined in a hot rolling line without being cooled to room temperature. The reducing atmosphere is an atmosphere containing a reducing gas such as hydrogen gas, or an atmosphere of a reducing flame which is established by adjusting the oxygen content in combustion air. When a reducing flame is used, the steel stock to be joined may be heated by the reducing flame itself.

DESCRIPTION OF PREFERRED EMBODIMENTS OF THE INVENTION

According to the present invention pressure joining of hot steel stock is carried out without the surfaces to be joined having been subjected to a separate step of descaling or cleaning. Such pretreatment is thought to be indispensable in the prior art. However, when the thickness of scale is extremely large, or the joining surfaces are roughened by the presence of scale, it is advisable to remove the scale from the welding surface to some extent prior to carrying out hot pressure welding of the present invention. This is because the thicker the scale, the longer the time required to reduce the scale in a reducing gas atmosphere, resulting in a lower production efficiency. Usually the thickness of scale ranges from about several thousand angstroms to about several tens micrometers, depending on its manufacturing history. There is no need to perform a pretreatment for removing scale having such a thickness in accordance with the present invention.

Pressure joining is carried out in a reducing atmosphere. Scale is reduced, and simultaneously joining of the surfaces of the steel stock is carried out. In a reducing atmosphere, there is no chance of the activated surfaces becoming oxidized again, resulting in a joint of high strength.

It is to be noted that heating in a reducing atmosphere causes reduction of scale and prevention of formation of scale. The degree of reduction of scale or prevention of scale formation is not necessarily perfect, but it is only necessary that a newly activated area of the joining surfaces be prepared during joining and be broad enough to ensure a sufficient level of joining strength.

Figure 1A:
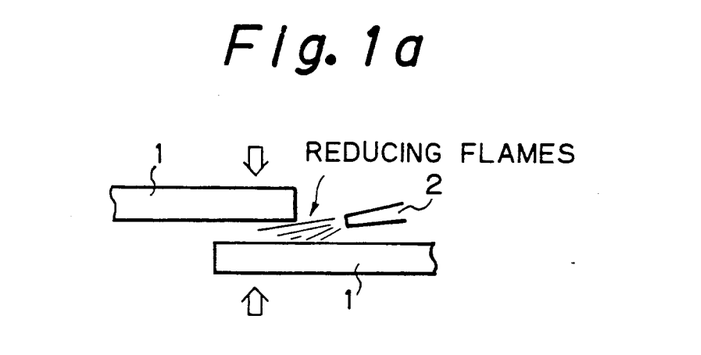
FIG. 1a is a schematic illustration of hot pressure welding of the present invention, in which hot steel stock is subjected to lap welding under pressure.
Figure 1B:
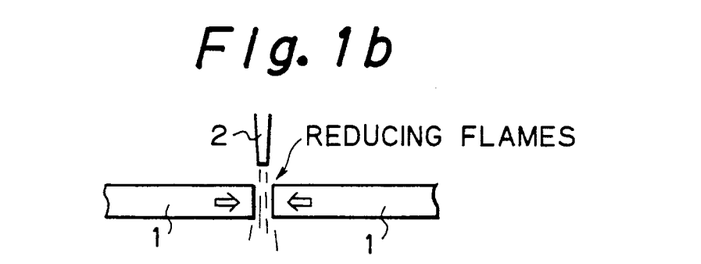
FIG. 1b is a schematic illustration of hot pressure welding of the present invention, in which hot steel stock is subjected to butt welding under pressure.

FIGS. 1a and 1b are schematic views illustrating joining of hot steel stock with a reducing flame. FIG. 1a shows lap joining of hot steel stock 1. FIG. 1b shows butt joining of hot steel stock 1. In both cases the joining interface is directly exposed to reducing flames supplied by a burner 2.

When a reducing gas is employed, a shielding box covering a joining area of the hot steel stock is used, and a reducing gas, such as $Ar+H_2$, and the like is introduced into the shielding box. In this arrangement, heating can be performed by high frequency induction heating or direct electric resistance heating. Immediately after heating for a while, pressure welding is carried out using pressure rolls or jigs which are provided within the shielding box.

The temperature of hot steel stock to be joined is not restricted to a specific one. However, the higher the temperature, the easier is the joining. Joining will be able to be performed at a temperature higher than about 500° C. It is usual to adjust the temperature of the hot steel stock to 1000° C. or higher so as to reduce the rolling load when hot rolling is carried out immediately after the joining is finished. It is desirable to heat a joining area to such a high temperature.

From a practical viewpoint, heating with a reducing flame is desirable for applying heat in a hot rolling line compared with a method of heating steel stock within a reducing-gas-filled shielding box, since the use of a reducing flame does not require additional and complicated equipment.

"Reducing flame" means a flame obtained by combustion of combustible gases such as acetylene, liquified petroleum gas (LPG), liquified natural gas (LNG), and coke-oven gas (COG) with oxygen gas in an amount smaller than that required for perfect combustion. The reducing flame contains reducing components such as hydrogen-radicals and $CH_2O$-radicals (hereunder referred to as "reducing radicals"). The larger the content of the reducing radicals, the higher is the level of reducibility of the flame. The before-mentioned formulas (1) and (2) define suitable conditions for obtaining a reducing flame containing an increased amount of reducing radicals at temperatures high enough for the purpose of the present invention.

Even when a reducing flame is produced under atmospheric conditions, oxygen gas which comes from the surrounding atmosphere reacts with remaining hydrogen and carbon monoxide gases to form reducing radicals. When combustion air enriched with oxygen is used, the content of nitrogen gas in the combustion air is decreased and the flame temperature increases, resulting in an increased generation of reducing radicals. An increase in temperature compensates for a decrease in flame temperature, which is caused by commingling with ambient air.

Reducibility of a flame is influenced by the mixing ratio of fuel and combustion air, and especially by the amount of oxygen gas contained therein. Thus, the inventors of the present invention conducted the following experiments in order to determine combustion conditions suitable for reducing oxide scale present on the surface of the hot steel stock and for heating it to a joining temperature under pressure.

Figure 2:
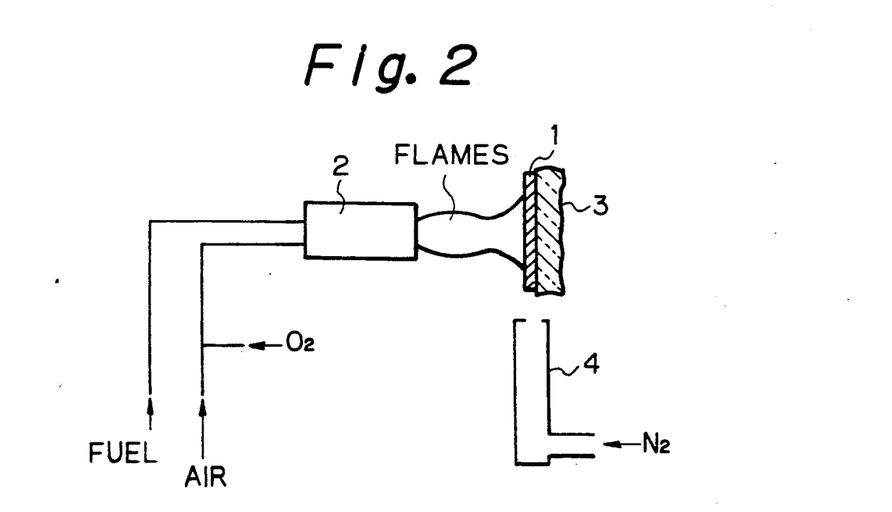
FIG. 2 is a schematic illustration explaining an experiment which was carried out to determine suitable heating conditions using a reducing flame.

FIG. 2 schematically shows experimental procedures in which a combustion fuel (COG) and air are supplied to a burner 2 and the air can be enriched with additional oxygen. A steel plate 1 to be heated has scale 10 micrometers thick. The steel plate is heated to 900° C. and the back side is covered with a heat insulating material 3. Usually, the thickness of scale on hot steel plate is on the order of about 10 micrometers. After reduction with a flame is carried out, the heated steel plate is rapidly cooled so as to visually inspect the degree of reduction. As a rapid cooling means, an apparatus 4 for spraying nitrogen gas, i.e., a cooling medium, is employed.

The oxygen enrichment ratio P (% by volume), i.e., the oxygen content in combustion air after addition of oxygen gas to combustion air, and oxygen ratio "m", i.e., the ratio of the real amount of oxygen supplied to a calculated amount of oxygen which is necessary to perform complete combustion were determined, and the relationship between the oxygen enrichment ratio P and the oxygen ratio m was also determined with respect to reducibility. The oxygen ratio m is called the "air ratio" when the combustion air is not enriched with additional oxygen. A desirable level of reducibility means that scale is completely reduced for 10 seconds or less. The length of time of about 10 seconds is the longest time length which can be allowed to take for joining hot steel stock in a real hot rolling line.

Figure 3:
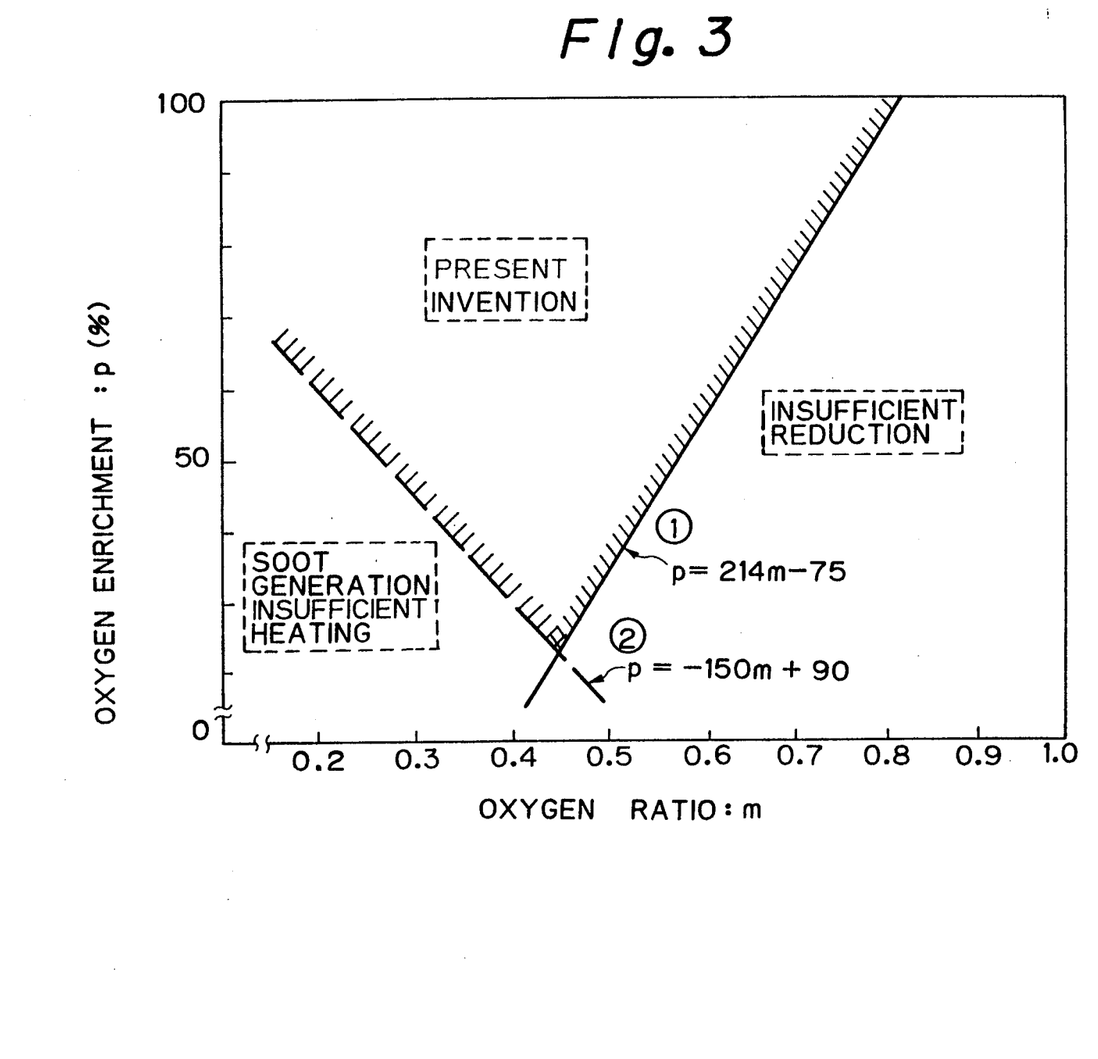
FIG. 3 is a graph showing a desirable range of an oxygen ratio and an oxygen enrichment ratio.

FIG. 3 shows test results in the form of a graph. In this graph, the area above line (1), i.e., the area defined by the formula $[P \geq 214\ m - 75]$ indicates the conditions under which reduction of scale can be carried out successfully. Namely, the smaller is the oxygen ratio m and the larger is the oxygen enrichment ratio P, the higher the reducibility of a flame becomes. This is because the smaller the oxygen ratio, the larger is the amount of reducing components and the larger the ratio P, the larger is the amount of reducing radicals.

A reducing flame of the present invention is effective not only for carrying our reduction of scale but also for heating or maintaining hot steel stock at a temperature suitable for joining.

When the oxygen ratio m is small, the temperature of a flame decreases resulting in a degradation in the heating ability of the flame. On the other hand, when the oxygen enrichment P is large, the temperature of flames increases to strengthen the heating ability of the flames.

The area above line (2), i.e., the area defined by the formula $[P \geq -150\ m + 90]$ indicates the conditions under which the temperature of steel stock 1 increases to about 1000° C. when heated by the flame. In the area below the line (2) the oxygen enrichment P is so small that the flame becomes excessively reducing, resulting in generation of soot. The soot is deposited on the joining surfaces, causing a degradation in joining strength.

Thus, the hatched area in FIG. 3, i.e., the area in which both of formulas (1) and (2) are satisfied is an area suitable for reducing and heating scale with a flame and effecting joining successfully.

The time required for effecting reduction of scale depends on the degree of oxidation, i.e., thickness of scale. It also depends on the heating temperature. The lower the heating temperature the longer the time required therefor. However, it is easy to determine the heating temperature and time suitable for obtaining a satisfactory level of reduction and heating after considering the dimensions of hot steel stock to be joined and the state of scale as long as the enrichment ratio P and the oxygen ratio m satisfy the requirements given by formulas (1) and (2).

When the temperature of steel stock is low, it is advisable to employ high frequency heating or direct electric resistance heating in addition to heating with flames so as to further shorten the time required for heating.

According to another preferred embodiment of the present invention, scale present on the joining surface of hot steel stock may be removed by means of hot scarfing and immediately after removal of the scale subjecting the hot steel stock to lap welding or butt welding under pressure. In this case a preheating flame for hot scarfing is made to be reducing by adjusting the heating conditions to be satisfied with the before-mentioned Formulas (1) and (2). The purpose of a reducing preheating flame is to establish a reducing atmosphere in a joining surface area. Such a reducing preheating flame is prepared at least during the step of joining just after hot scarfing with an oxygen jet.

Generally, hot scarfing is a method of heating the steel stock surface with a combustion flame at high temperatures to partly melt down the surface, and then impinging an oxygen jet against the melt to carry out oxidation as well as to blow off the oxides formed in order that surface defects or cracks may be removed. Thus, in hot scarfing under usual conditions, it is inevitable that oxidation takes place on the joining surfaces before joining is carried out. Thus, the resultant joining does not exhibit satisfactory joining strength even if scale has been removed completely by hot scarfing.

Namely, hot scarfing under usual conditions will result in melting-down and blowing-off followed by oxidation, which is undesirable for joining. In contrast, according to the present invention the preheating flame is reducing and is utilized as a shielding gas to establish a reducing atmosphere on the joining surfaces. For this purpose it is preferable that the preheating flame is prepared under conditions satisfying the before-mentioned Formulas (1) and (2). It is to be noted that it is not always necessary to use a reducing flame before effecting joining. Perfect combustion under usual conditions is advisable during heating, since it is preferable for increasing temperature and for decreasing the preheating time.

Figure 4:
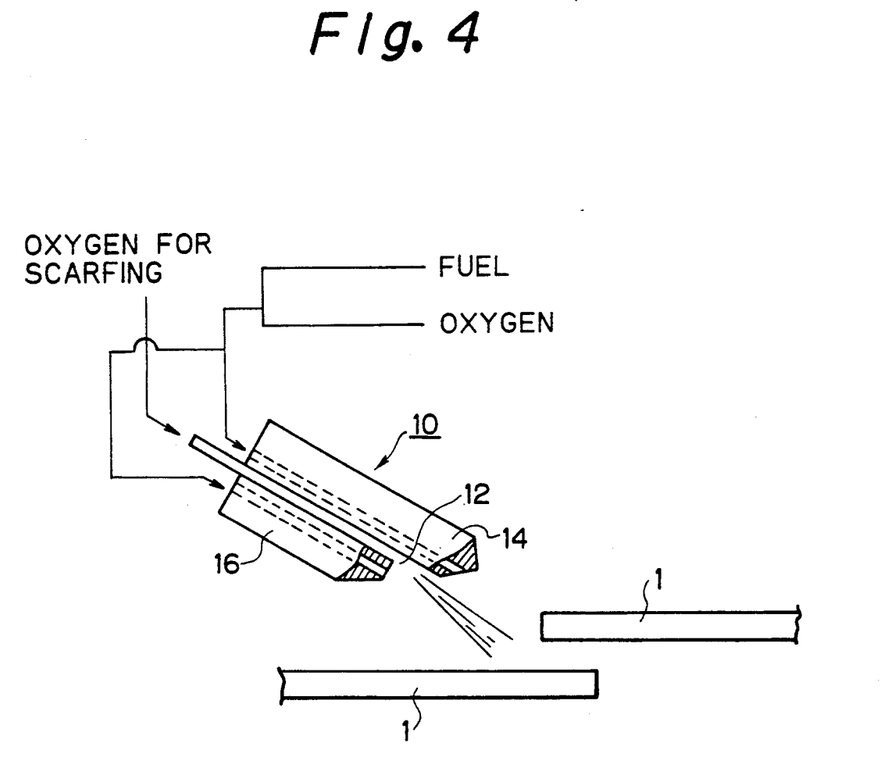
FIG. 4 is a schematic illustration of heating with a reducing flame of hot scarfing.

FIG. 4 shows the step of removing scale from hot steel stock by means of a hot scarfer. In FIG. 4, the hot scarfer 10 is of the premixing type in which a fuel and oxygen are mixed before ejection through a burner nozzle. The premixing type scarfer includes the one in which a fuel and oxygen are mixed just within a burner nozzle. This is called "nozzle-mixed type" hereunder. Another type of scarfer called the "postmixing" type may be use.

The hot scarfer 10 comprises an oxygen ejecting nozzle 12 and upper and lower preheating tips 14, 16 through which a premixed gas of fuel and oxygen is ejected to form a preheating flame. Hot steel stock 1 to be joined is heated by the preheating flame to a temperature of 900°–950° C. Thereafter, oxygen gas of high purity is ejected through the oxygen ejecting nozzle 12 onto the surface of the heated steel stock 1. Due to an oxidization reaction between ferrous components and oxygen, the temperature rapidly increases and the molten surface area of the steel stock is blown off together with scale present thereon. The hot scarfer is moved relative to the hot steel stock so that descaling can be achieved in a desired area on the surface of the steel stock.

A hot scarfer is very effective for removing scale. A relatively thick scale can be removed easily and rapidly, even though it comprises oxides of Si and Mn. After the molten surface is blown off, the ejection of oxygen is stopped and the preheating flame is kept reducing so as to maintain a reducing atmosphere on the joining surfaces. Re-oxidation of a clean surface after removal of scale can be prevented successfully and the remaining scale can be reduced. In this state, the surfaces of the hot steel stock are joined under pressure.

According to hot welding under pressure of the present invention the joining step of steel plates can be performed as follows.

Figure 5:
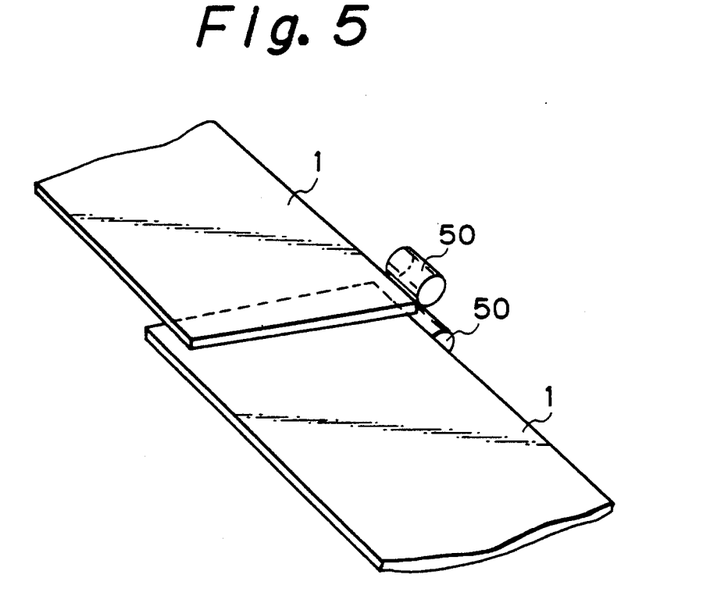
FIG. 5 is a schematic illustration showing how to apply pressure using pressure rolls in lap welding.

In case of lap welding, as shown in FIG. 5, using a pair of pressure rolls 5 provided on the upper and lower sides of the hot steel plate, an overlapped portion is rolled down from one end to the other.

Figure 6:
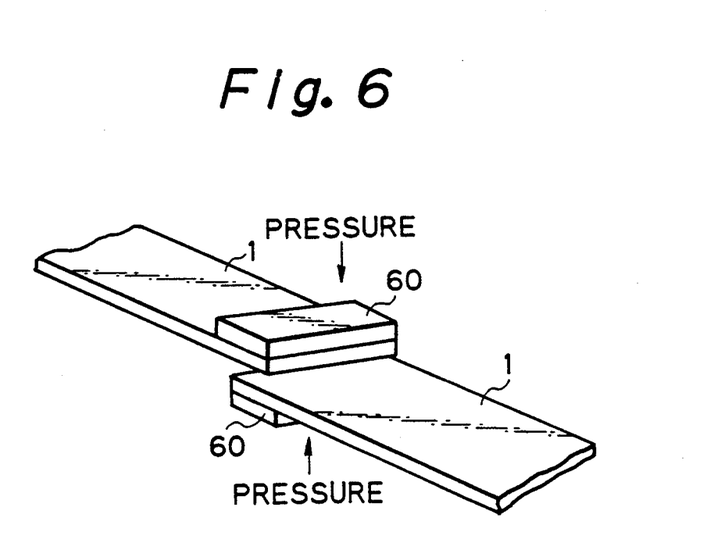
FIG. 6 is a schematic illustration showing how to apply pressure using pressure jigs in lap welding.

When the width of the hot steel plate is rather small, a jig 60 such as shown in FIG. 6 may be used. The width of the jig 60 is the same or a little larger than that of the steel plate. The entirety of the joining surfaces of the steel plates are joined together using the upper and lower jigs 60 by a single press.

Figure 7:
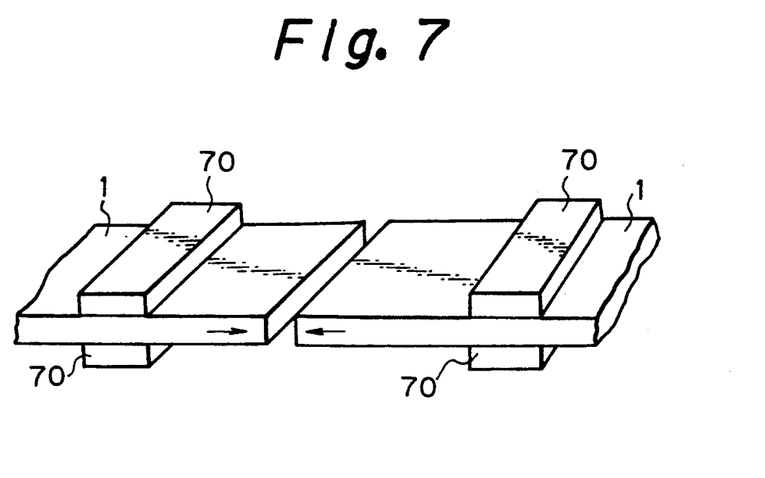
FIG. 7 is a schematic illustration showing how to apply pressure using pressure jigs in butt welding.

FIG. 7 shows the case where butt welding is carried out. Two pairs of jigs 70 are used to fix and press the steel plates to be joined and the opposed ends of the steel plates 1 are pressed against each other.

Joining can be performed while the bonding area is stationary or while it is being conveyed.

When a steel sheet such as a hot rolled steel sheet is joined with another one while both are stationary, the provision of a looper is necessary. Furthermore, the joining is performed while the steel sheet is moving, an additional joining apparatus which moves along with the steel sheet is used.

Figure 8:
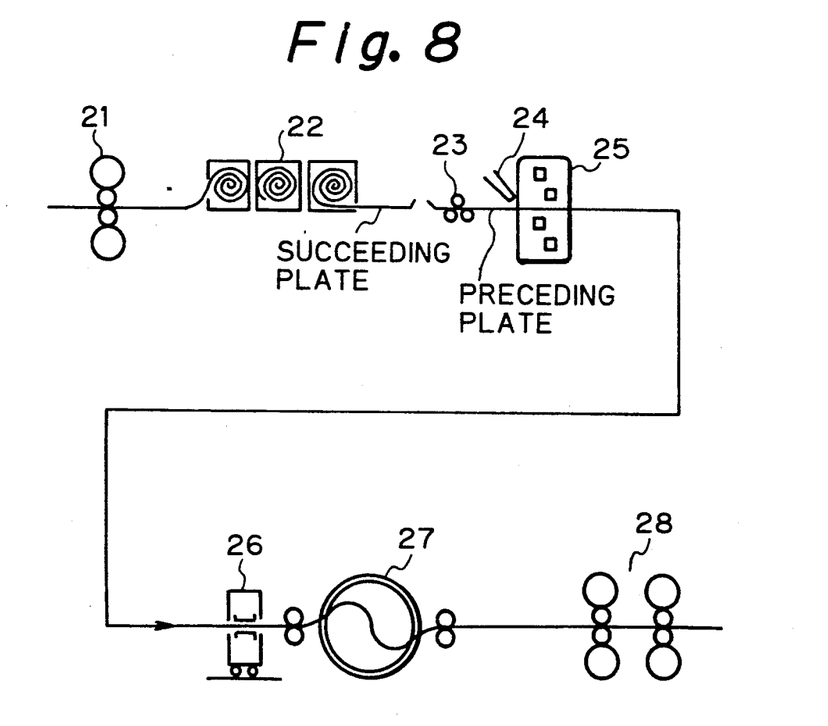
FIG. 8 is a schematic illustration of a hot rolling line to which hot pressure welding of the present invention is applied.

As mentioned before, the present invention is effective for achieving a continuous hot rolling process. FIG. 8 shows a schematic illustration of a hot rolling line into which the method of the present invention is incorporated. Namely, between rough rolling mills 21 and finish rolling mills 28 a preceding plate and a succeeding plate are joined in accordance with the method of the present invention.

The front end of the succeeding steel plate, after being subjected to rough rolling with rough rolling mills 21 and coiled temporarily in a coil box 22, is joined to the rear end of the preceding steel plate under hot conditions before going into finish rolling after being passed through a roll straightener 23 in accordance with the present invention. Namely, both ends are heated by a burner 24 in a reducing atmosphere and then are joined using a joining apparatus 25. The joined succeeding steel plate, after being passed through a side shearing machine 26 and a looper 27, is successively subjected to finish hot rolling with finish rolling mills 28. Thus, according to the present invention, steel plates which have been rough rolled and not cooled to room temperature are joined and then are continuously supplied to a hot finish rolling step to establish a continuous hot rolling process.

FIGS. 9a-9e respectively illustrate five embodiments (a)-(e) in which the opposing ends of preceding and succeeding hot steel plates are joined in accordance with the present invention in the continuous hot rolling production line shown in FIG. 8.

Figure 9A:
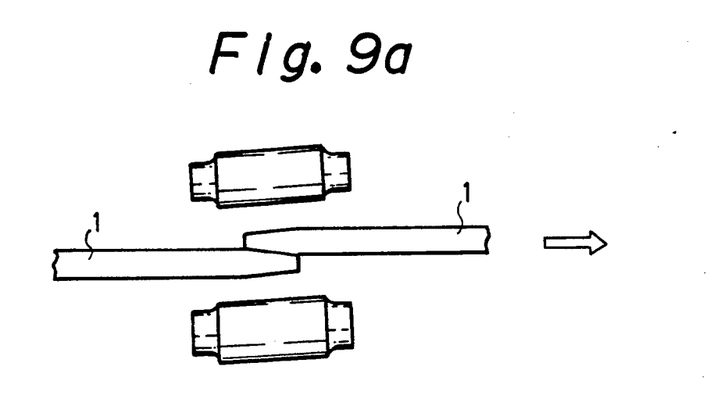
FIGS. 9a-9e are schematic illustrations showing other embodiments of pressure welding of the present invention.

(a) As shown in FIG. 9a, prior to contacting one another, the rear end of the preceding plate 1 and the front end of the succeeding plate 1 are subjected to edge preparation. After being lapped, the prepared edges are heated in a reducing atmosphere and joined under pressure by rolling, for example. An open arrow shows the direction of movement of the steel plates.

Figure 9B:
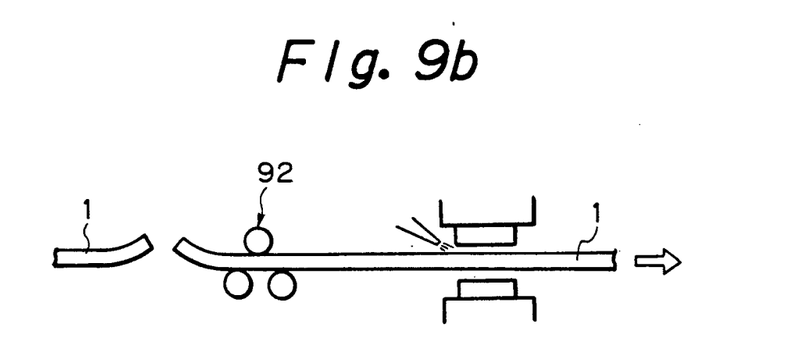

(b) FIG. 9b shows the case in which prior to effecting lap welding or butt welding the rear end of the preceding plate 1 and/or the front end of the succeeding plate 1 are subjected to straightening with a straightener 92. After being straightened, both ends are lapped or butted and heated in a reducing atmosphere and joined under pressure.

Figure 9C:
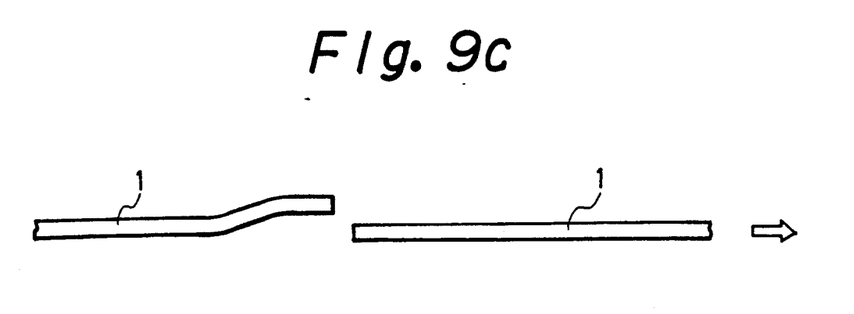

(c) As shown in FIG. 9c, prior to lap welding the rear end of the preceding plate 1 or the front end of the succeeding plate 1 are subjected to bending to form an upward camber. The ends of the preceding and succeeding hot steel plates are lapped and heated in a reducing atmosphere to effect joining under pressure, such as by rolling in the longitudinal direction.

Figure 9D:
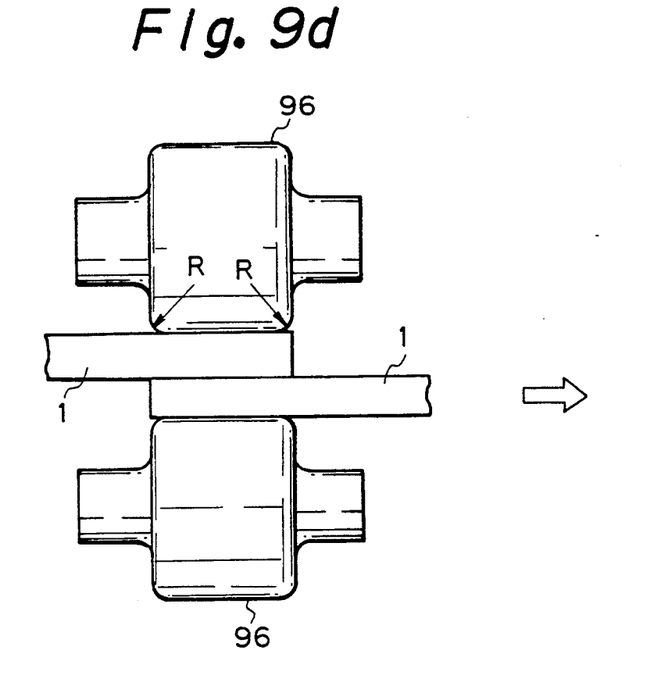

(d) FIG. 9d shows the case in which the rear end of the preceding plate 1 and the front end of the succeeding plate 1 are lapped. After being heated in a reducing atmosphere the lapped ends of the plates are joined under pressure by rolling transversely with a pair of upper and lower pressure rolls 96 having round corners or edges.

Figure 9E:
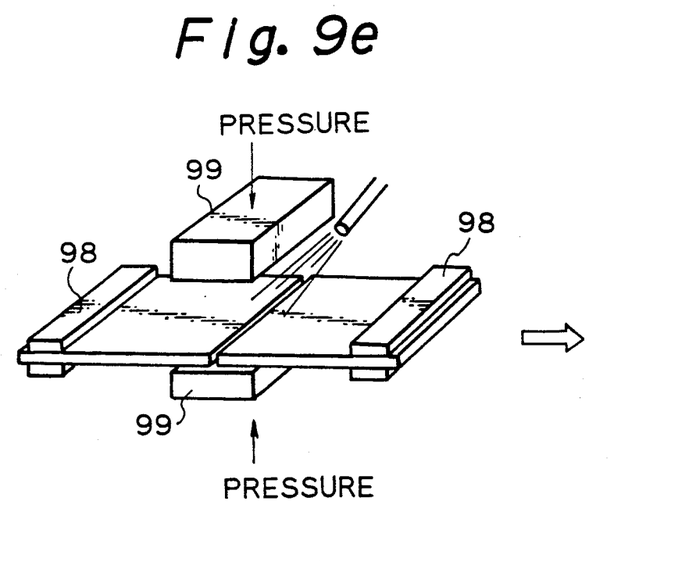

(e) FIG. 9e shows the case in which the rear end of the preceding plate 1 and the front end of the succeeding plate 1 are cut to give newly-prepared edges. These edges are heated in a reducing atmosphere and are placed against each other. While both edges are brought into contact under pressure with holding jigs 98, the two hot steel plates are joined by pressing with another pair of upper and lower jigs 99.

The present invention has been described mainly referring to the case in which a hot steel plate is used as "hot steel stock", but the method of the present invention can be applied to hot pressure welding of other steel stock, such as steel bars, steel wires, and steel shapes in the same way.

EXAMPLES

Hot steel plates measuring 15 mm thick, 300 mm wide, and 500 mm long (C: 0.10%, Si: 0.5%, Mn: 1.2%) were prepared, and the opposing end portions were lapped partially for a distance of 25 mm from the edge, heated and joined in a reducing atmosphere. Treating conditions are summarized in Table 1.

(a) Tests Nos. 1–22

A burner of the nozzle-mixed type was used and a mixed gas was ejected through a ring-shaped slit nozzle to provide a flame. Fuel was COG at a flow rate of 20 $Nm^3$/hour. The oxygen ratio (m) and the oxygen enrichment rate (P) were varied as shown in Table 1. In these test runs, a shielding box was not used.

In Tests Nos. 2–22, scale was intentionally formed first by heating to 800° C. using a usual oxidizing flame in which the oxygen ratio (m) was 1. After that a reducing atmosphere was prepared under the conditions shown in Table 1 to heat to the indicated joining temperature. Test specimens were held for the indicated period of time and joining under pressure was performed.

In Test No. 1, the specimens were heated to 800° C. in the same manner as in Tests Nos 2–22 to form scale. After that, the temperature was decreased to 500° C. and heating with a reducing flame and joining under pressure were performed in the same way as for Tests Nos. 2–22.

(b) Test Nos. 23 and 24

A shielding box was used. As a reducing gas a mixed gas of 70% by volume of Ar+$H_2$ bal. was filled within the shielding box. Heating was carried out using high-frequency induction heating.

Namely, the steel plates were heated to 800° C. in the air and then the atmosphere was changed to the above reducing atmosphere. After heating to a given temperature, joining under pressure was carried out.

(c) Tests Nos. 25-30

Tests Nos. 25-30 were comparative examples. Specimens were heated to a given temperature using a usual perfect combustion flame and were joined under pressure. As a reference example, Test No. 30 was carried out, in which scale was previously and completely removed and the test specimens were heated with a reducing flame to 1200° C. to perform joining under pressure.

The following treatment conditions were common to all the tests.

(d) Reduction in thickness

The lapped plates initially having a total thickness of 30 mm were rolled down to 22.5 mm with a reduction in thickness of 25%.

(e) Joining

Joining was carried out using a pair of upper and lower pressure rolls which rolled transversely to achieve joining under pressure. The temperature while the specimens were joined under pressure is indicated in Table 1.

The resulting joints were subjected to a room temperature bending test with a bending radius of 15 mm, which is thought to be most severe.

In Table 1, the cracking ratio is also shown. The cracking ratio is defined as follows:

Cracking ratio = (total length of cracks/total length of joined line) × 100(%)

The reducing time indicated in Table 1 means the time interval in which specimens were maintained in a reducing flame or in a reducing atmosphere. After maintaining the specimens for an indicated period, pressurizing by rolling was started.

The test results for Tests Nos. 25-29 in Table 1 show that the scale formed by using usual perfect combustion flame is difficult to reduce so that due to the presence of much remaining scale the cracking ratio is extremely high.

In contrast, according to the present invention even if scale is present on the joining surfaces, the scale will be reduced in a reducing atmosphere during joining under pressure, resulting in satisfactory joints with an extremely low cracking ratio. The test results of Tests Nos. 23 and 24 show that pressure joining in a reducing gas atmosphere also results in satisfactory joints of high bonding strength.

In Tests Nos. 13, 19, and 22, since formula (1) was not satisfied, reduction of scale did not occur thoroughly and the cracking ratio was rather high. In Tests Nos. 12, 16 and 20, formula (2) was not satisfied and soot was generated, resulting in a decrease in bonding strength due to the presence of the soot between the joining interface.

In Test No. 30, which was a reference example, since after complete removal of scale joining under pressure was performed in an reducing atmosphere, the cracking ratio was very small. The cracking ratio of the joints prepared in accordance with the method of the present invention was comparable to that of this reference example. Thus, a previous and complete descaling step is not necessary.

TABLE 1

| Test No. | Steel Plate Temp. (°C.) | Reducing Conditions | | | Cracking (%) | Remarks |
|---|---|---|---|---|---|---|
| | | Reducing Flame | | | Reducing Time in $H_2$ + 70% Ar (sec) | |
| | | Ratio (m) | P (%) | Reducing Time (sec) | | |
| 1 | 500 | 0.4 | 50 | 10 | — | 9 | ○ |
| 2 | 800 | 0.4 | 50 | 10 | — | 7 | ○ |
| 3 | 1000 | 0.4 | 50 | 10 | — | 2 | ○ |
| 4 | 1200 | 0.4 | 50 | 10 | — | 0 | ○ |
| 5 | 1350 | 0.4 | 50 | 10 | — | 0 | ○ |
| 6 | 1000 | 0.4 | 50 | 2 | — | 5 | ○ |
| 7 | 1000 | 0.4 | 50 | 6 | — | 4 | ○ |
| 8 | 1000 | 0.4 | 50 | 30 | — | 0 | ○ |
| 9 | 1000 | 0.4 | 70 | 10 | — | 0 | ○ |
| 10 | 1000 | 0.4 | 60 | 10 | — | 0 | ○ |
| 11 | 1000 | 0.4 | 30 | 10 | — | 5 | ○ |
| 12 | 980 | 0.4 | 21 | 10 | — | 25 | |
| 13 | 1000 | 0.6 | 50 | 10 | — | 72 | |
| 14 | 1000 | 0.5 | 50 | 10 | — | 4 | ○ |
| 15 | 1000 | 0.3 | 50 | 10 | — | 2 | ○ |
| 16 | 960 | 0.2 | 50 | 10 | — | 28 | |
| 17 | 1000 | 0.2 | 60 | 10 | — | 7 | ○ |
| 18 | 1000 | 0.6 | 60 | 10 | — | 8 | ○ |
| 19 | 1000 | 0.7 | 70 | 10 | — | 42 | |
| 20 | 960 | 0.3 | 40 | 10 | — | 29 | |
| 21 | 1000 | 0.5 | 40 | 10 | — | 9 | ○ |
| 22 | 1000 | 0.5 | 30 | 10 | — | 52 | |
| 23 | 1000 | — | — | — | 10 | 5 | ○ |
| 24 | 1000 | — | — | — | 30 | 0 | ○ |
| 25 | 500 | Perfect Combustion Heating | | | | 100 | Comparative |
| 26 | 800 | " | | | | 100 | |
| 27 | 1000 | " | | | | 100 | |
| 28 | 1200 | " | | | | 95 | |
| 29 | 1350 | " | | | | 85 | |
| 30 | 1200 | 0.4 | 50 | 10 | — | 5 | |

Note
○: Present Invention

What is claimed is:

1. A method of carrying out hot pressure welding of hot steel stock, comprising butt joining or lap joining hot steel stock in a reducing atmosphere under pressure while under hot conditions, the reducing atmosphere being maintained using a reducing flame which is obtained by combusting fuel and combustion air under conditions defined by the following formulas:

$$P \geq 214\, m - 75 \qquad (1)$$

$$P \geq -150\, m + 90 \qquad (2)$$

wherein, P is an oxygen enrichment ratio of oxygen in the combustion air (% by volume), and m is an oxygen ratio of oxygen combusted relative to an amount of oxygen required for complete combustion of the fuel.

2. A method as set forth in claim 1 wherein the steel stock is a steel plate, steel wire, or steel bar.

3. A method as set forth in claim 1 wherein the joining is carried out without a separate step of removing scale in a hot rolling line.

4. A method as set forth in claim 1 wherein pressure is applied by using pressure rolls of pressure jigs during joining.

5. A method as set forth in claim 1 wherein the joining is carried out after rough rolling but prior to finish rolling.

6. A method as set forth in claim 1 wherein the joining of hot steel stock is carried out after hot scarfing, the joining being performed in a preheating reducing flame which is established by a preheating flame.

7. A method as set forth in claim 1 wherein the joining is carried out after heating by means of induction heating or direct electric resistance heating, the joining being performed in a reducing atmosphere.

8. A method of carrying out hot pressure welding of hot steel stock, comprising butt joining or lap joining the hot steel stock in a reducing atmosphere under pressure while under hot conditions, the reducing atmosphere being maintained using a reducing flame obtained by combusting fuel and combustion air under conditions defined by the following formulas:

$$P \geq 214\, m - 75 \qquad (1)$$

$$P \geq -150\, m + 90 \qquad (2)$$

wherein, P is an oxygen enrichment ratio of oxygen in the combustion air which does not exceed 70% (% by volume), and m is an oxygen ratio of oxygen combusted relative to an amount of oxygen required for complete combustion of the fuel.

9. A method as set forth in claim 8 wherein the steel stock is a steel plate, steel wire, or steel bar.

10. A method as set forth in claim 8 wherein the joining is carried out without a separate step of removing scale in a hot rolling line.

11. A method as set forth in claim 8 wherein pressure is applied by using pressure rolls or pressure jigs during joining.

12. A method as set forth in claim 8 wherein the joining is carried out after rough rolling but prior to finish rolling.

13. A method of carrying out hot pressure welding of hot steel stock, comprising butt joining or lap joining the hot steel stock after hot scarfing, the joining being performed in a preheating reducing flame established by a preheating flame, the hot steel stock being under pressure and hot conditions during the joining.

14. A method as set forth in claim 13 wherein the steel stock is a steel plate, steel wire, or steel bar.

15. A method as set forth in claim 13 wherein pressure is applied by using pressure rolls or pressure jigs during joining.

16. A method as set forth in claim 13 wherein the joining is carried out after rough rolling but prior to finish rolling.

17. A method of hot rolling steel stock, comprising steps of (i) butt joining or lap joining ends of individual sections of hot steel stock in a hot condition to form a continuous steel stock, the hot steel stock being under pressure and in a reducing atmosphere during the joining step and (ii) supplying the continuous steel stock to a hot rolling mill.

18. A method as set forth in claim 17 wherein the steel stock is a steel plate, steel wire, or steel bar.

19. A method as set forth in claim 17 wherein the joining is carried out without a separate step of removing scale in a hot rolling line.

20. A method as set forth in claim 17 wherein pressure is applied by using pressure rolls or pressure jigs during joining.

21. A method as set forth in claim 17 wherein the joining is carried out after rough rolling but prior to finish rolling.

22. A method as set forth in claim 17 wherein the reducing atmosphere is maintained using a reducing flame which is obtained by combusting fuel and combustion air under conditions defined by the following formulas:

$$P \geq 214\, m - 75 \qquad (1)$$

$$P \geq -150\, m + 90 \qquad (2)$$

wherein, P is an oxygen enrichment ratio of oxygen in the combustion air (% by volume), and m is an oxygen ratio of oxygen combusted relative to an amount of oxygen required for complete combustion of the fuel.

23. A method as set forth in claim 17 wherein the joining is carried out after heating by means of induction heating or direct electric resistance heating, the joining being performed in a reducing atmosphere.

* * * * *